United States Patent [19]

Schwartz

[11] Patent Number: 4,494,211
[45] Date of Patent: Jan. 15, 1985

[54] BALANCED SYSTEM FOR RANGING AND SYNCHRONIZATION BETWEEN SATELLITE PAIRS

[75] Inventor: Jay W. Schwartz, Potomac, Md.

[73] Assignee: The United States of America as represented by the Secretary of the Navy, Washington, D.C.

[21] Appl. No.: 444,139

[22] Filed: Nov. 24, 1982

[51] Int. Cl.³ .............................................. G06F 11/00
[52] U.S. Cl. ........................................ 364/571; 73/6; 368/47; 375/107
[58] Field of Search .............................. 364/131–132, 364/143, 183, 569, 571; 343/55 M, 6.5 R, 7 R, 17.7, 352, 356, 358, 367; 73/6; 371/20, 4; 375/107–110; 368/46–47

[56] References Cited

U.S. PATENT DOCUMENTS

| | | | |
|---|---|---|---|
| 3,472,019 | 10/1969 | Webb | 58/24 |
| 3,772,258 | 3/1973 | Besson et al. | 73/6 |
| 3,789,653 | 2/1974 | Brejaud | 73/6 |
| 3,940,558 | 2/1976 | Gabbard et al. | 375/109 X |
| 4,014,166 | 3/1977 | Cateora et al. | 368/47 X |
| 4,231,114 | 10/1980 | Dolikian | 375/107 X |
| 4,337,463 | 6/1982 | Vangen | 368/47 X |
| 4,368,987 | 1/1983 | Waters | 368/46 |

Primary Examiner—Jerry Smith
Assistant Examiner—Gary V. Harkcom
Attorney, Agent, or Firm—Robert F. Beers; William T. Ellis; Charles E. Krueger

[57] ABSTRACT

A balanced ranging and synchronization (R&S) system for a master(M)-slave(S) satellite pair including a clock, a transmitter, a receiver, a time difference measuring device and a calculating device on both M and S. Each satellite transmits timing signals synchronized to its clock, receives the timing signals from the other satellite and measures the time difference between the transmission and reception of the timing signals. The time difference measured on each satellite is then transmitted to the other satellite. The caluculating device on each satellite utilizes these time difference measurements to calculate the asynchronism between the clocks and the range between the satellites. Finally the S clock is adjusted so that the asynchronism is reduced to within predetermined limits.

17 Claims, 7 Drawing Figures

BALANCED SYSTEM FOR RANGING AND SYNCHRONIZATION BETWEEN SATELLITE PAIRS

BACKGROUND OF THE INVENTION

The invention relates generally to systems for measuring range and synchronizing clocks on moving and non-moving platforms, and more particularly, to a balanced system for ranging and synchronization between a pair of satellites.

There is an increasing class of satellite pair applications that requires the clocks on the satellite pair to be synchronized. Examples include utilizing the satellite pair for triangulation navigation or for synchronous characterization of independent regions of space.

Existing systems for intersatellite clock synchronization employ measurements to determine the time difference between the clock on each satellite and a ground-based standard. After determination of these time differences, a correction factor is computed and applied to each satellite clock. An example of an existing system is the NAVSTAR Global Positioning System.

These existing systems have many inherent problems including deleterious signal effects indroduced by the earth's atmosphere, limited times for viewing satellites from ground sites, and spectrum restrictions. As a result of these problems, existing systems are accurate to only several tens of nanoseconds. Additionally, it should be noted that these systems do not actually synchronize the clocks, but only compute correction factors that compensate for asynchronisms.

The range between satellites is also measured by systems utilizing ground sites and the resulting range measurements are accurate to only about ten meters.

OBJECTS OF THE INVENTION

Accordingly, it is an object of the invention to provide an intersatellite synchronization system utilizing direct communication links between satellites instead of indirect ground base-satellite communications links.

It is a further object of the invention to provide an intersatellite synchronization system that actually synchronizes the clocks instead of only compensating for asynchonisms with correction factors.

It is still a further object of the invention to provide a ranging and synchronization system that is more accurate than existing systems.

SUMMARY OF THE INVENTION

The above and other objects are achieved in the present invention which comprises a balanced ranging and synchronization (R & S) system between a master satellite (M) and a slave satellite (S).

The system is balanced since both M and S have independent frequency standards on board and since the equipment on M and S is the same except that the clock on S is adjusted while the clock on M is not. The R & S system of the invention does not require a communication link to any outside platforms. Additionally, the present R & S system does not require an external intersatellite range determination to synchronize the clocks. This independence from external references increases the accuracy and stability of the R & S system of the present invention. Essentially, the present balanced R & S system utilizes the high stability of state-of-the-art oscillators to dramatically reduce the complexity and to increase the accuracy of clock synchronization and intersatellite ranging.

The system elements include a stable crystal oscillator, a transmitter, a receiver, a time difference measuring (TDM) device, and a calculating device on both M and S. The designation of M and S can be alternated from time-to-time if desirable since the only difference between M and S is that the S clock is adjusted while the M clock is not.

A clock is defined as a counter with a stable oscillator as a reference. The counter counts time intervals which are a multiple of the period of the stable oscillator. Clock time is defined as the number of time intervals counted since a given reference time. The concept of true time is defined as the time on a clock external to the system being analysed.

The present invention synchronizes the clocks on M and S so that at a given true time, $T_{iM}$, the clock time on M and S is the same within predetermined limits.

This synchronization is achieved by transmitting a timing signal from each satellite that is synchronized to its clock. For example, the signal may be transmitted when the clock counter changes from $C_i-1$ to $C_i$. Note that the output from the M clock and the S clock may not be $C_i$ at the same true time.

The TDM device on each satellite measures the time difference between the transmission of its signal and the reception of the signal from the other satellite. The time difference measured on M is transmitted to S. The time difference measured on S may be transmitted to M to provide a measurement of the intersatellite range and clock asynchronism on M, but no adjustment is made to the M clock.

The calculating devices on M and S then utilize these measured time differences to calculate the asynchronism between the M and S clocks at true time $T_{iM}$ and to claculate the intersatellite range.

Finally the calculating device on S advances or retards the clock time on S until the asynchronism is reduced to within predetermined limits.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Briefly, the invention is a system for synchronizing the clocks on a satellite pair and determining the range between the satellite pair. The satellites in the pair are designated the master (M) and the slave (S).

The system determines the asynchronism between the clocks and the range between the satellites by measuring the time difference between the transmission and reception of signals generated for a given clock output signal and then performs calculations, described below, utilizing these time differences. The system then adjusts the S clock so that the asynchronism becomes less than a predetermined value.

Each satellite has a clock positioned thereon. The following discussion will relate to the clock on S, but will also apply to the clock on M. A clock is defined as a counter with a reference oscillator where the reference generates reference pulses separated by a constant time interval. The clock time on S namely, $t_{iS}$, is a measure or count of the reference pulses from the above described reference, starting from some arbitrary time $t_{OS}$ to time $t_{iS}$. Thus $$t_{iS} = C_{iS}\tau_{SR} + t_{OS} \tag{1}$$

where $\tau_{SR}$ is the time interval between reference pulses on S, and $C_{iS}$ is the clock value on S at $t_{iS}$, i.e., the number of reference pulses counted on S from $t_{OS}$ to $t_{iS}$.

As set forth above, an object of the invention is to synchronize the clocks on M and S. In order to define synchronisation the concept of the true time of the M-S system will be utilized. True time, T, is defined as the time on a third clock external to the M-S system. Thus, if $T_{iM}$ is the true time when the M clock value transitions from $C_{iM}-1$ to $C_{iM}$ and $T_{iS}$ is the true time when S clock value transitioned from $C_{iS}-1$ to $C_{iS}$ then the asynchronism at time $T_{iM}$ is $\Delta T_i = T_{iS} - T_{iM}$.

A description of the operation of the invention is set forth below. The principles of satellite timing and descriptions of system components not fully described below are set forth in the book by J. J. Spilker, Jr. entitled *Digital Communication by Satellite* Prentice-Hall, New Jersey, 1977.

Figure 1:
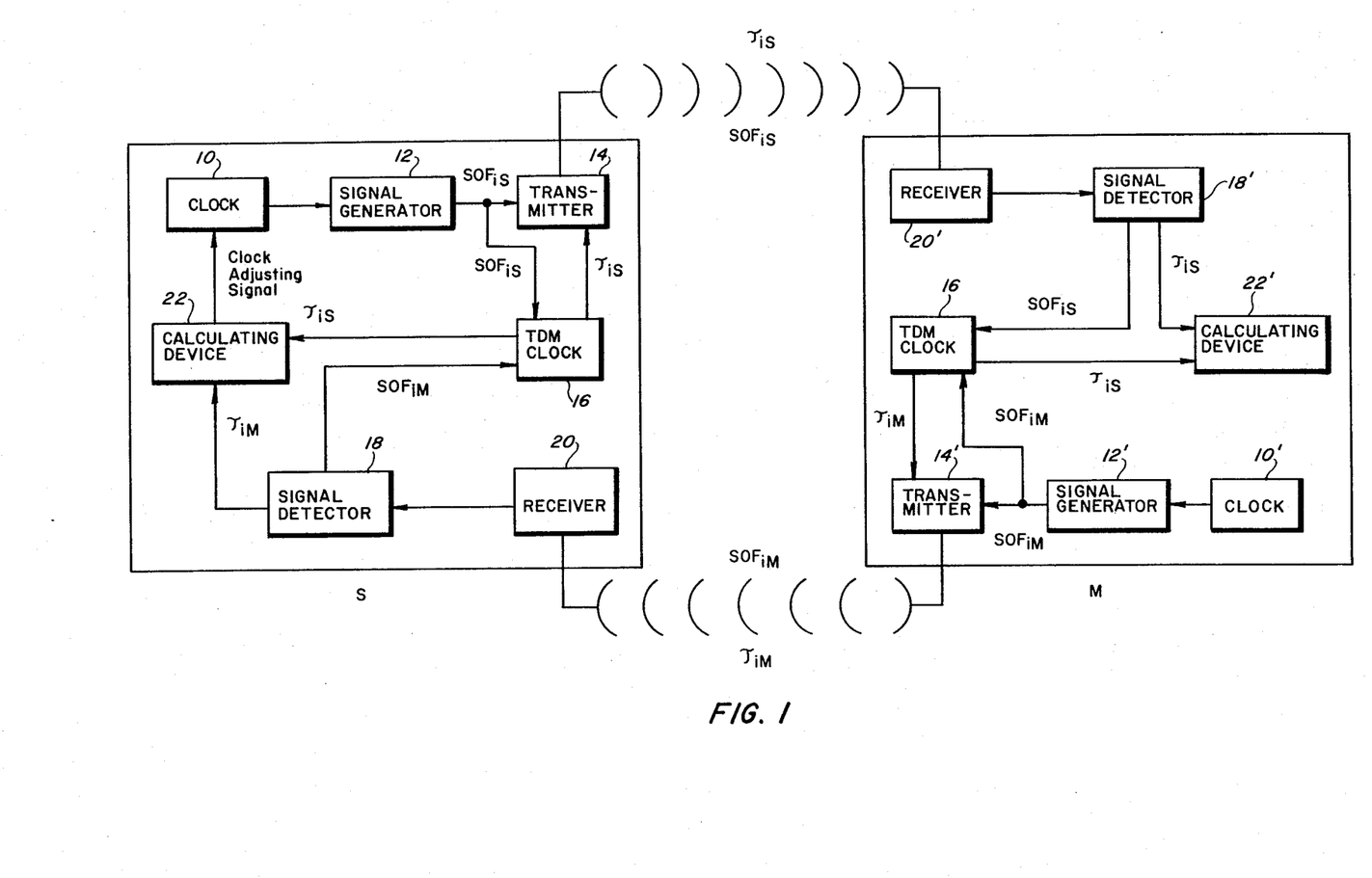
FIG. 1 is a block diagram of a general embodiment of the invention.

Referring now to the drawings, wherein like reference numerals designate identical or corresponding parts throughout the several views and wherein the identical system component on S and M will be designated by a numeral for the component on S and the same numeral with a prime for the component on M, and more particularly to FIG. 1 thereof, a block diagram of the present invention is depicted. Reference will be made below to FIGS. 2-5 depicting specific embodiments of the system set forth in FIG. 1.

In FIG. 1, two satellites, M and S, are depicted. The following discussion relates to the system components on S. It is understood that the same system components on M are performing the same functions.

The output signal from an S clock 10 is coupled to an S signal generator 12. The signal generator initiates transmission of a timing signal, $SOF_{iS}$, from an S transmitter 14 when the S clock assumes the value $C_{iS}$. The transmitter includes means for generating a carrier wave and a modulator. The timing signal $SOF_{iS}$ is generated at true time $T_{iS}$.

An S time difference measuring (TDM) clock 16 is started by the $SOF_{iS}$ signal. Thus the S TDM clock 16 is started and the S timing signal $SOF_{iS}$ is transmitted at true time $T_{iS}$. Similarly the M TDM clock is started and the M timing signal $SOF_{iM}$ is transmitted at $T_{iM}$.

The S TDM clock 16 continues running until it is stopped by the S signal detector when $SOF_{iM}$ is received at the S receiver 20 at time $(T_{iM})_S$. Thus, the S TDM clock 16 measures the time difference, $\tau_{iS}$, given by $$\tau_{iS} = (T_{iM})_S - T_{iS} \tag{3}$$

The quantity $\tau_{iS}$ is transmitted to M.

As stated above, the system components on M have been performing the same operations as those on S. Thus, the TDM clock on M 16' has measured the interval $$\tau_{iM} = (T_{iS})_M - T_{iM} \tag{4}$$

where $T_{iM}$ is the true time of the transmission $SOF_{iM}$ from M and $(T_{iS})_M$ is the true time of reception of $SOF_{iS}$ from S at M. This quantity, $\tau_{iM}$ is transmitted to S.

A calculating device 22 on S receives the quantity $\tau_{iS}$ from the S TDM clock 16 and the quanity $\tau_{iM}$, from the S receiver 20. It is understood that $\tau_{iM}$ and $\tau_{iS}$ must be encoded and decoded by the transmitter and receiver respectively. These encoding and decoding steps will be decribed in terms of a digital embodiment of the invention set forth below with reference to FIG. 2.

The calculating device determines the asychronisim, $\Delta T_i = T_{iS} - T_{iM}$, and determines whether the S clock should be advanced or set back. The operation of the calculating device will now be described.

Note that $$(T_{iM})_S = T_{iM} + d_f + R \tag{5}$$

where R is the time delay in the free space channel between M and S and $d_f$ is the equipment delay in the intersatellite channel between M and S. Analogously, $$(T_{iS})_M = T_{iS} + d_r + R \tag{6}$$

where $d_r$ is the equipment delay between S and M. Substitution of eqs. (5) and (6) into eqs. (3) and (4) gives:

$$\tau_{iS} = (T_{iM} - T_{iS}) + d_f + R \tag{7}$$

and $$\tau_{iM} = (T_{iS} - T_{iM}) + d_r + R \tag{8}$$

Finally, by alternately sustracting and adding eqs. (7) and (8) the following equations are obtained for asynchronism and range:

$$\Delta T_i = (T_{iS} - T_{iM}) = \frac{(\tau_{iM} - \tau_{iS}) + (d_f - d_r)}{2} \tag{9}$$

and $$R = \frac{(\tau_{iM} + \tau_{iS}) - (d_f + d_r)}{2} \tag{10}$$

Additionally, the intersatellite distance at time T, D, is given by:

$$D = R \cdot C \tag{12}$$

where C is the speed of light in a vacuum.

Therefore, the equipment delays $d_f$ and $d_r$, or more specifically, the sum of $d_f + d_r$ and the difference $d_f - d_r$, must be estimated, and the calculating device depicted in FIG. 1 must be capable of performing the arithmetic operations of eqs. (9) and (10) on the quantities $\tau_{iM}$, $\tau_{iS}$, R, $d_f$, $d_r$, and C and provide as outputs the quantities $\Delta T_i$ and D.

Furthermore, recognizing that modern oscillators are very stable, the time history of $T_i$ can be tracked in order to minimize the effects of measurement noise and to make the clock adjustments less frequent and more regular. A simple embodiment of a tracking algorithm is a so-called "random walk" filter in which counters would keep score of the number of times $\Delta T$ is greater than zero ($T_{iS}$ greater than $T_{iM}$) and the number of times $\Delta T$ is negative ($T_{iM}$ greater than $T_{iS}$). When the difference in those numbers exceeds some threshold value, the S clock is appropriately advanced or retarded and the counters are reset to zero. Since the primary reason for adjustments will normally be the difference in the frequencies of the reference oscillators on S and M, and since this difference will change very slowly, improved performance can be obtained with a second-order loop (c.f. Spilker pp. 359–365) which in effect estimates frequency difference. Except in the special case of near-zero frequency difference, a second-order loop will result in adjustments being made in only one direction with the interval between adjustments varied to minimize the asynchronsim of the clocks. These operations are performed in the calculating device 22 of FIG. 1. Random walk filters and second order loops are old in the art and are not part of the invention.

Figure 2:
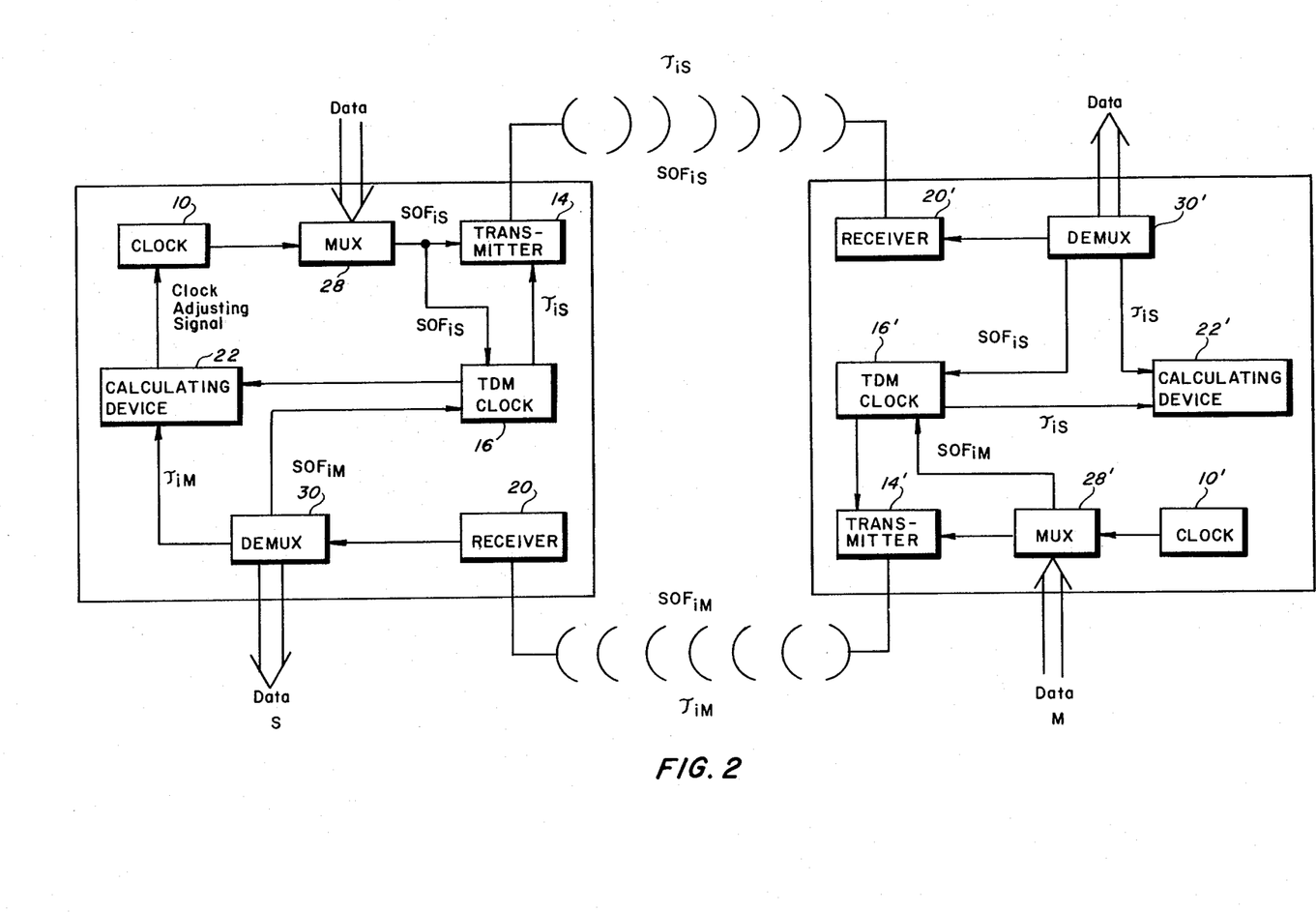
FIG. 2 is a block diagram of a digital embodiment of the invention.

FIG. 2 is a block diagram of a preferred embodiment utilizing a crosslink digital data format. The carrier for the digital data transferred between M and S may be either an rf wave or an optical beam generated by a laser. Since the components on M are identical to components on S only these components on S will be described below.

Referring now to FIG. 2, the signal generator 12 of FIG. 1, is a digital multiplexer (MUX) 28, and the signal detector, 18 of FIG. 1, is a digital demultiplexer (DEMUX) 30. The data between the satellites is transferred at a 12.5 Mb/sec rate. It is understood that the components depicted in FIG. 2 are adapted to process data transferred at this rate. The transmitter 14, receiver 20, MUX 28, DEMUX 30 and calculating device 22 may be standard devices well known in the art and are not part of the present invention. The clock 10 is described below in connection with FIG. 4.

Each TDM clock 16 is started when an SOF word is generated by the MUX 28 and stopped when an SOF word is received by the DEMUX 30. Thus, $\tau_{iS}$ and $\tau_{iM}$ are measured.

Figure 3:
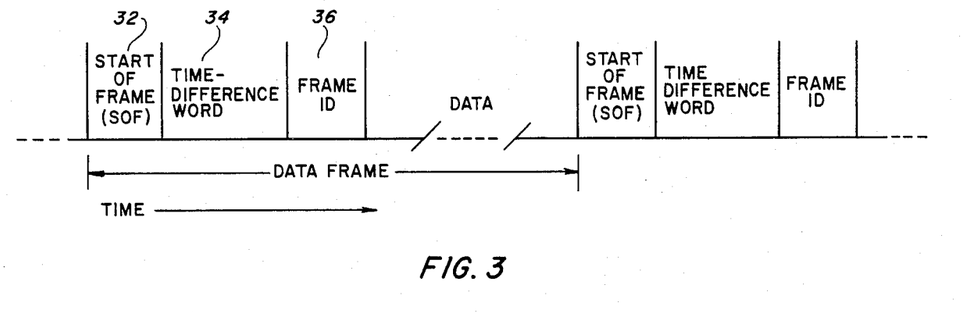
FIG. 3 is a schematic diagram of the format for digital data transferred between M and S.

The transmitted data in the S to M data link is formatted by the S MUX 2. FIG. 3 depicts the transmitted data format which is the same for the S to M link and the M to S link. Referring now to FIG. 3, the data flow is divided into frames where each frame begins with a start-of-frame word 32 ($SOF_{iS}$) generated at $T_{iS}$ (S clock output $C_{iS}$). This $SOF_{iS}$ 32 is a unique digital pattern generated by the S MUX 28 in response to the S clock assuming the value $C_{iS}$. The $SOF_{iS}$ is followed by a time difference word 34 which is the value of the time difference, $\tau_s$, measured by the S TDM clock 16 for the previous frame. For example, in the (i+1)th frame transmitted from S the TDW is the digital encoding of $\tau_{iS}$. Next a Frame ID word 36 is generated which encodes the value of i so that time ambiguities may be resolved. The Frame ID word is followed by a fixed number of data digits to complete the frame. Thus, the frames in the S data stream are synchronized to the S clock 10.

Referring back to FIG. 2, the method of synchronizing the S clock to the M clock will now be described. The standard length of a frame is N time intervals generated by the S reference oscillator. However, if the calculating device 22 determines that the S clock should be advanced or retarded, a clock adjusting signal (described more fully below) is generated by the calculating device. This clock adjusting signal causes the clock to shorten or lengthen the frame by one reference time interval, $\tau_{SR}$. The frames in the M data stream are similarly synchronized to the M clock where the frames are always N time intervals long.

Figure 4A:
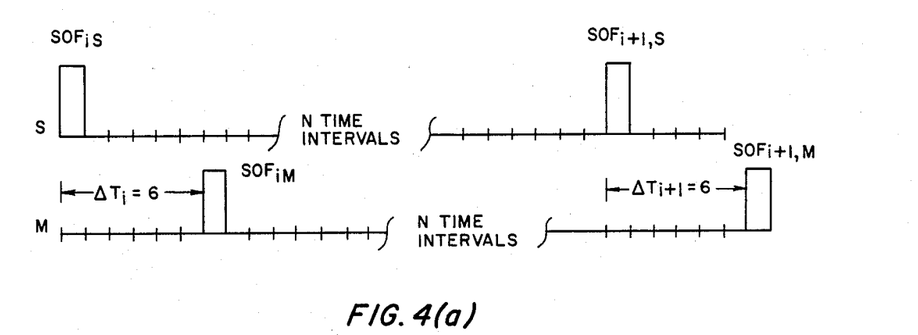
FIGS. 4a and 4b are graphs illustrating the method of synchronizing the clock on M and S.
Figure 4B:
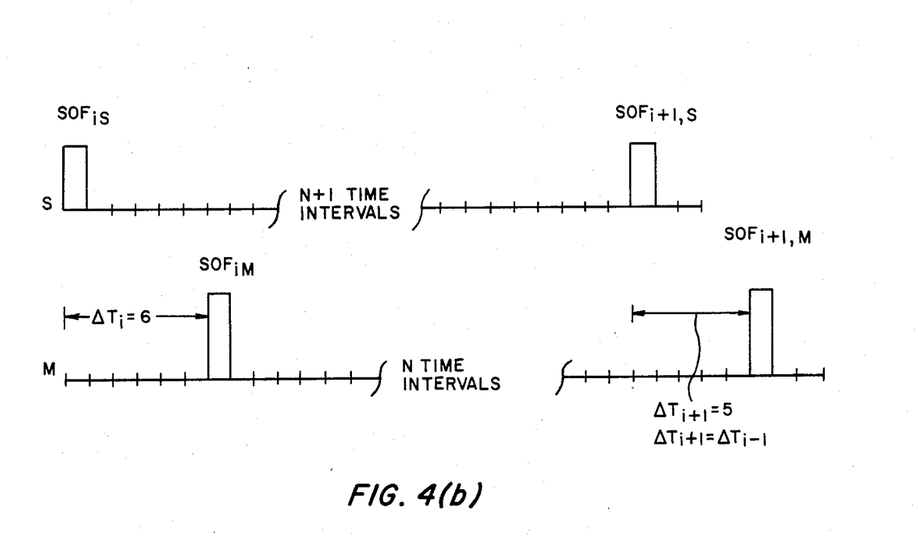

FIGS. 4a and 4b are two graphs depicting this synchronization process. Referring now to those figures, FIG. 4a depicts an S frame and an M frame where both frames are N intervals long. Note that $\Delta T_i = \Delta T_{i+1}$. In FIG. 4b the S frame is lengthened one time interval by the clock while the length of the M frame is unchanged. Note that the asyncronism has been reduced by one time interval, i.e., $\Delta T_{i+1} = \Delta T_i - 1$. Thus, $\Delta T$ is reduced one interval per frame until its value is less than $\tau_{SR}$.

Figure 5:
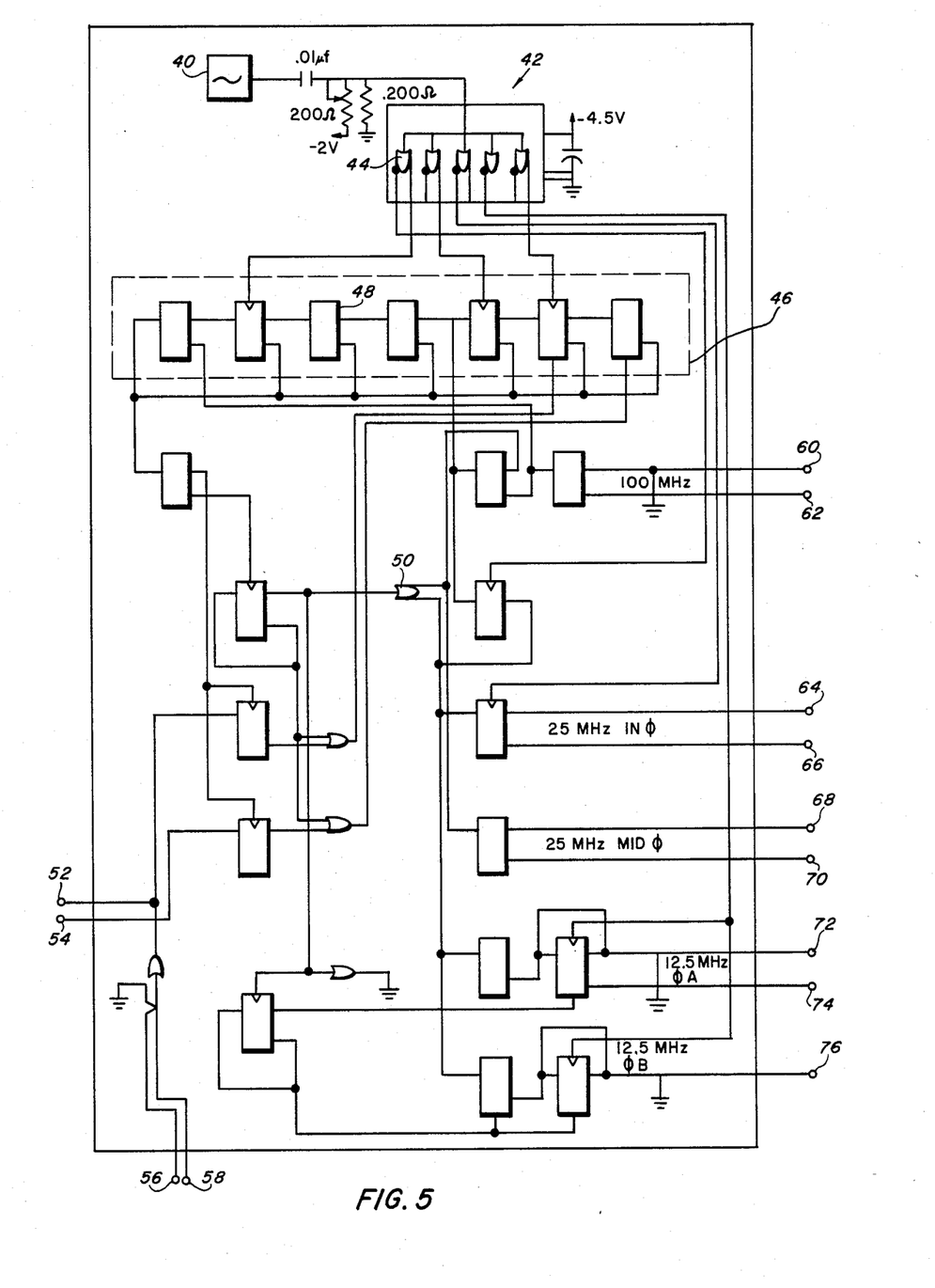
FIG. 5 is a schematic diagram of a digital electronic circuit for a clock.

FIG. 5 is a schematic diagram of an exemplary digital electronic circuit for an S clock referenced to a free running quartz oscillator running nominally at $F_o = 400$ MHz. The circuit depicted provides output signals at 400 MHz and several submultiples thereof, i.e., 100 MHz, 25 MHz and 12.5 MHz. These signals are coherent, that is, the zero crossing of a signal at one frequency coincides with a zero crossing at all higher frequencies. The S clock provides clock signals to the components of the R & S system and other systems on S.

Referring now to FIG. 5, the output signal from the S stable quartz reference oscillator 40 is the input signal of a digital fan out 42 including five digital OR gates 44. The outputs of the digital fan out 42 are connected with the inputs of a Johnson counter 46 including 7 digital FLIP-FLOPS 48. The Johnson counter 46 includes clock adjusting inputs 52, 54 for receiving a clock adjusting signal from the calculating device 22 and M/S inputs 56, 58 for receiving an external signal for designating whether the satellite is to operate in an M or S mode.

The S clock also includes first outputs 60, 62 where the first output signal is a 100 Mbps digital pulse train, second outputs 64–70 where the second output signal is a 25 Mbps digital pulse train and third output 72–76 where the third output signal is a 12.5 Mbps digital pulse train. Lower frequency clock signals needed on S are generated from one of these outputs. For example, the SOF signal is generated by counting pulses from the 12.5 Mbps pulse train.

In the system actually designed the third output provides the clock output signal at 12.5 Mbps bit rate. The second output signal at 25 Mbps is utilized for Manchester coding the data. If it is desirable not to have 2.5 nanosecond jumps due to the clock adjustments, any of the outputs can be passed through a phase-locked loop (see Spilker) in order to smooth these adjustments.

The operation of the Johnson counter will now be described. The digital time adjusting input signal at the time-adjusting inputs 52, 54 includes a change/no change component and an advance/retard component. If the change/no change component indicates no change then the first, second and third output signals are not altered. If the change/no change component indicates change then the phase of the first, second and third output signals is advanced or retarded by one 2.5 nanosecond interval depending on the state of the advanced retard component of the time-adjusting input signal.

The calculating device 22 in the digital embodiment is a microprocessor programmed to implement the operations described above. In the system actually designed, the microprocessor utilized was either a Signetics 8X−300 or an AMD 29116. The choice of microprocessor is determined by requirements external to the R & S system.

The design of the MUX 28 and DEMUX 30 units utilized standard techniques. To minimize variation in time delays due to aging and temperature or voltage changes, digital implementations were used wherever practical. The bit-synchronizer was a digital-transition-tracking-loop (DTTL) design of the type described in the above-referenced book by Spilker.

In laboratory tests, the design utilizing a random-walk filter in the calculating device was found to keep the S clock within 2.5 ns of the M clock at almost all times. The standard deviation between M and S clocks was less than 1.25 ns for frequency differences between the reference oscillators on M and S up to 150 Hz ($F_o$=400 MHz). Computer simulations in which the calculating device incorporates a second-order loop predict that the standard deviation will be about 0.8 ns. The error is primarily a quantization error due to the discrete period $\tau_{SR}$ and can be reduced even further by passing an S clock output through a phase-locked loop as described above. The total error will be the combination of this error and any errors in the estimation of equipment delays $d_f$ and $d_r$.

Figure 6:
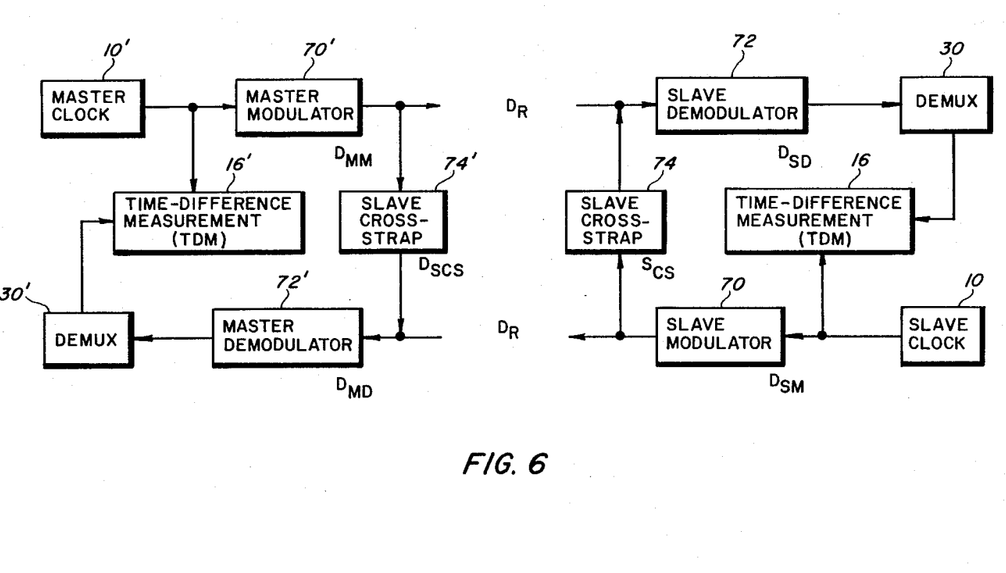
FIG. 6 is a block diagram of a system utilized to calibrate or compensate for equipment time delays.

A major source of error in the synchronization system are slow variations in equipment delays, $d_r$ and $d_f$, particularly in the receiver. FIG. 6 depicts a system that may be utilized to calibrate or compensate for equipment time delay.

Referring now to FIG. 6, note that FIG. 6 is similar to FIG. 2, a digital embodiment of the invention, however only the S modulator section 70 of the S transmitter and the S demodulator section 72 of the S receiver are depicted. Additionally, cross straps 74 link the output of the S modulator 70 to the input of the S demodulator 72 and the output of the M modulator 70' to the input of the M demodulator 72'.

If an SOF is generated by the master clock at true time $T_{OM}$ and by the slave clock at $T_{OS}$ the TDM clock on M will receive timing pulses at $$T_{M1} = T_{OM} \tag{13}$$

$$T_{M2} = T_{OM} + D_{MM} + D_{MD} + D_{MCS} \tag{14}$$

$$T_{M3} = T_{OS} + D_{SM} + D_{MD} + D_R \tag{15}$$

where $D_{MM}$ ($D_{SM}$) is the time delay in the M(S) modulator 70,70', $D_{MD}$ ($D_{SD}$) is the time delay in the M(S) demodulator 72,72'. $D_{MCS}$ ($D_{SCS}$) is the time delay in the M(S) cross strap 74, 74' and $D_R$ is the time for an electromagnetic signal to propagate between M and S. Note that the pulse received at $T_{M1}$ is received directly from the M clock 10' the pulse received at $T_{M2}$ is received from the M DEMUX 30' after the signal is routed through the M modulator 70', the M cross strap 74' and the M demodulator 72', and that the pulse received at $T_{M3}$ is received from the M DEMUX 30' after the SOF generated on S at time $T_{OS}$ is routed through the S modulator, transmitted from S to M, and routed through the M demodulator.

Similarly, the TDM clock on S will receive timing pulses at $$T_{S1} = T_{OS} \tag{16}$$

$$T_{S2} = T_{OS} + D_{SM} + D_{SD} + D_{SCS} \tag{17}$$

$$T_{S3} = T_{OM} + D_{MM} + D_{SD} + D_R \tag{18}$$

If the counters of the TDM clocks on M and S are started at $T_{M1}$ and $T_{S1}$ respectively and stopped at $T_{M3}$ and $T_{S3}$ respectively then the resulting counts on M and S are:

$$C_M = T_{M3} - T_{M1} = (T_{OS} - T_{OM}) + D_{SM} + D_{MD} + D_R \tag{19}$$

and $$C_S = T_{S3} - T_{S1} = (T_{OM} - T_{OS}) + D_{MM} + D_{SD} + D_R \tag{20}$$

Utilizing these counts, the time asynchronism and range is given by:

$$2(T_{OS} - T_{OM}) = (C_M - C_S) - (D_{MM} - D_{SM}) + (D_{SD} - D_{MD}) \tag{21}$$

and $$2D_R = (C_M + C_S) - (D_{MM} + D_{SM}) - (D_{SD} + D_{SS}) \tag{22}$$

These equations are equivalent to eqs. (9) and (10). Referring particularly to eq. (21), note that the calculation of the asynchronism requires precise knowledge of the demodulator delays, $D_{SD}$ and $D_{SM}$. As is well known in the art, these delays tend to change value over time thereby introducing a time-varying equipment error into the calculation of both the clock asynchronism and the range.

The calculation of the asynchronism may be made independent of the demodulator delay times by starting the respective counters of the M and S TDM clocks at $T_{M2}$ and $T_{S2}$ (instead of $T_{M1}$ and $T_{M2}$) and stopping the counters at $T_{M3}$ and $T_{S3}$. The resulting counts are :

$$C'_M = T_{M3} - T_{M2} = (T_{OS} - T_{OM}) + (D_{SM} - D_{MM}) + D_R - D_{MCS} \tag{23}$$

and $$C'_S = T_{S3} - T_{S2} = (T_{OM} - T_{OS}) + (D_{MM} - D_{SM}) + D_R - D_{SCS} \tag{24}$$

Using these counts the resulting time asynchronism and range are given by:

$$2(T_{OS} - T_{OM}) = (C'_M - C'_S) + 2(D_{MM} - D_{SM}) + (D_{SCS} - D_{MCS}) \tag{25}$$

$$2D_R = (C'_M + C'_S) + (D_{MCS} + D_{SCS}) \tag{26}$$

Note that in eq. (25) the dependence on the demodulator delays, $D_{MD}$ and $D_{SD}$, has been replaced on a dependence on the cross strap delays, $D_{MCS}$ and $D_{SCS}$ and additional dependence on $D_{MM}$ and $D_{MS}$. These cross strap and transmitter delays can be made very stable compared to the demodulator delays. Thus, the use of a compensation or calibration system stabilizes the equipment delays over long periods of time thereby increasing the accuracy of asynchronism and range measurements.

The balanced RS system of the present invention has been described while disposed on a satellite pair. It is understood that the system, as described and claimed herein, may be utilized on any platform pair including, for example, ships, airplanes or balloons.

Obviously, numerous (additional) modifications and variations of the present invention are possible in light of the above teachings. It is therefore to be understood that, within the scope of the appended claims, the invention may be practiced otherwise than as specifically described herein.

What is claimed and desired to be secured by Letters Patent of the United States is:

1. A balanced ranging and synchronization (R & S) system for synchronizing a clock on a slave platform (S) to a master platform (M) and for measuring the distance between M and S comprising:

an M clock, positioned on M, for generating an M clock output signal;

an S clock, positioned on S, for generating a S clock output signal;

M signal transmitting means on M, interconnected with said M clock, for transmitting an M timing signal in response to a predetermined M clock output signal;

S signal transmitting means on S, interconnected with said S clock, for transmitting an S timing signal in response to a predetermined S clock output signal;

M receiving means on M for receiving signals, including said S timing signal, from S;

S receiving means on S for receiving signals, including said M timing signal, from M;

M time difference measuring (TDM) means, interconnected with said M clock and said M receiving means, for measuring the M time difference between the transmission of said M timing signal and the reception of said S timing signal and for encoding said M time difference in an M time difference output signal;

S time difference measuring (TDM) means, interconnected with said S clock and said S receiving means, for measuring the S time difference between the transmission of said S timing signal and the reception of said M timing signal and for encoding said S time difference in an S time difference output signal;

S calculating means, interconnected with said S TDM means, said S receiving means and said S clock and with inputs including said M and S time difference output signals, for calculating the asynchronism between said M clock and said S clock, and for generating an S clock adjusting output signal for advancing or retarding said S clock so that said S clock is synchronized with said M clock.

2. The balanced R & S system, recited in claim 1, wherein:

said M clock is a first digital counter interconnected with a first stable quartz oscillator; and said S clock is a second digital counter interconnected to a second stable quartz oscillator.

3. The R & S system recited in claim 2 wherein:

said M TDM measuring means is an M TDM digital clock for generating an M time difference word (TDW); and said S TDM measuring means is an S TDM digital clock for generating an S TDW.

4. The R & S system recited in claim 3 with said M signal transmitting means including:

an M multiplexer (MUX), interconnected with said M TDM clock, for formatting a data stream transmitted between M and S into frames where each frame is started by a start-of-frame word ($SOF_{iM}$) generated at time $T_{iM}$ and each frame includes a Frame ID word and an M TDW, and for starting said M TDM clock when said $SOF_{iM}$ is generated; and with said S signal transmitting means including:

an S multiplexer (MUX), interconnected with said S TDM clock, for formatting a data stream transmitted between S and M into frames where each frame is started by a start-of-frame word ($SOF_{iS}$) generated at time $T_{iS}$ and each frame includes a Frame ID word and a S TDW and for starting said S TDM clock when said $SOF_{iS}$ is generated.

5. The R & S system recited in claim 4 with said M receiving means including:

an M demultiplexer (DEMUX) for stopping said M TDM clock when said $SOF_{iS}$ is received at time $(T_{iS})_M$; and an M demodulator; and with said S receiving means including:

an S DEMUX for stopping said S TDM clock when said $SOF_{iM}$ is received at time $(T_{iM})_S$; and an S demodulator.

6. The R & S system recited in claim 5 further comprising:

S compensating means interconnecting said S modulator with said S demodulator and M compensating means interconnecting said M modulater with said M demodulater, said S and M compensating means for stabilizing the equipment delay times in said R & S system.

7 The R & S system recited in claim 6 wherein:

said data stream from M to S is carried by an M laser beam generated by an M laser; and said data stream from S to M is carried by an S laser beam generated by an S laser.

8. A balanced ranging and synchronization (R & S) system for synchronizing a clock on a slave platform (S) to a master platform (M) and for measuring the distance between M and S comprising:

an M clock, positioned on M, for generating an M clock output signal;

an S clock, positioned on S, for generating a S clock output signal;

M signal transmitting means on M, interconnected with said M clock, for transmitting an M timing signal in response to a predetermined M clock output signal;

S signal transmitting means on S, interconnected with said S clock, for transmitting an S timing signal in response to a predetermined S clock output signal;

M receiving means on M for receiving signals, including said S timing signal, from S;

S receiving means on S for receiving signals, including said M timing signal, from M;

M time difference measuring (TDM) means, interconnected with said M clock and said M receiving means, for measuring the M time difference between the transmission of said M timing signal and the reception of said S timing signal and for encoding said M time difference in an M time difference output signal;

S time difference measuring (TDM) means, interconnected with said S clock and said S receiving means, for measuring the S time difference between the transmission of said S timing signal and the reception of said M timing signal and for encoding said S time difference in an S time difference output signal;

S calculating means, interconnected with said S TDM means said S receiving means and said S clock and with inputs including said M and S time difference output signals, for calculating the asynchronism between said M clock and said S clock; according to the formula $$\Delta T_i = (T_{iS} - T_{iM}) = \frac{(\tau_{iM} - \tau_{iS}) + (d_f - d_r)}{2}$$

and for calculating the time delay in the free space channel between M and S according to the formula:

$$R = \frac{(\tau_{iM} + \tau_{iS}) - (d_f + d_r)}{2}$$

where $T_{iS}$ is the true time when the predetermined S clock output signal is generated, $T_{iM}$ is the true time when the predetermined M clock output signal is generated, $\tau_{iS}$ is the time delay encoded in the S time difference output signal, $\tau_{iM}$ is the time delay encoded in said M time difference output signal;

$d_r$ is the time equipment delay in the channel between S and M, $d_f$ is the equipment delay in the channel between M and S, said S calculating means also for generating a clock adjusting output signal for advancing or retarding said S clock so that said S clock is synchronized with said M clock.

9. The balanced R & S system, recited in claim 8, wherein:
said M clock is a first digital counter interconnected with a first stable quartz oscillator; and
said S clock is a second digital counter interconnected to a second stable quartz oscillator.

10. The R & S system recited in claim 9 wherein:
said M TDM measuring means is an M TDM digital clock for generating an M time difference word (TDW); and
said S TDM measuring means is an S TDM digital clock for generating an S TDW.

11. The R & S system recited in claim 10 with said M signal transmitting means including:
an M multiplexer (MUX), interconnected with said M TDM clock, for formatting a data stream transmitted between M and S into frames where each frame is started by a start-of-frame word ($SOF_{iM}$) generated at time $T_{iM}$ and each frame includes a Frame ID word and an M TDW, and for starting said M TDM clock when said $SOF_{iM}$ is generated; and
with said S signal transmitting means including:
an S multiplexer (MUX), interconnected with said S TDM clock, for formatting a data stream transmitted between S and M into frames where each frame is started by a start-of-frame word ($SOF_{iS}$) generated at time $T_{iS}$ and each frame includes a Frame ID word and a S TDW and for starting said S TDM clock when said $SOF_{iS}$ is generated.

12. The R & S system recited in claim 11 with said M receiving means including:
an M demultiplexer (DEMUX) for stopping said M TDM clock when said $SOF_{iS}$ is received at time $(T_{iS})_M$; and
an M demodulator; and
with said S receiving means including:
an S DEMUX for stopping said S TDM clock when said $SOF_{iM}$ is received at time $(T_{iM})_S$; and
an S demodulator.

13. The R & S system recited in claim 12 further comprising:
S compensating means interconnecting said S modulator with said S demodulator and M compensating means interconnecting said M modulater with said M demodulater, said S and M compensating means for stabilizing the equipment delay times in said R & S system.

14. The R & S system recited in claim 13 wherein:
said data stream from M to S is carried by an M laser beam generated by an M laser; and said data stream from S to M is carried by an S laser beam generated by an S laser.

15. A balanced ranging and synchronization (R & S) system for synchronizing the clock on a slave platform (S) to a master platform (M) and for determining the range between M and S where M and S are transfering high-rate digital data therebetween said R & S system comprising:
an M clock including an M stable oscillator and an M digital counter for providing an M digital clock output signal; and
an S clock including an S stable oscillator and an S digital counter for providing an S digital clock output signal;
M multiplexing means interconnected with said M clock for formatting an M digital data stream transmitted from M to S into frames where each frame is started by an M start-of-frame word ($SOF_{iM}$) generated at time $T_{iM}$ by said M multiplexing means upon receiving a predetermined M digital clock output signal;
S multiplexing means, interconnected with said S clock for formatting an S digital data stream transmitted from S to M into frames where each frame is started by an S $SOF_{iS}$ generated at time $T_{iS}$ by said S multiplexing means upon receiving a predetermined S digital clock output signal;
M demultiplexing means for receiving said $SOF_{iS}$ transmitted from S, where said $SOF_{iS}$ is received at time $(T_{iS})_M$;
S demultiplexing means for receiving said $SOF_{iM}$ transmitted from M where said $SOF_{iM}$ is received at $(T_{iM})_S$;
M TDM means, interconnected with said M clock and said M demultiplexer means where said M TDM includes an M TDM digital clock for measuring the time interval between the time said $SOF_{iM}$ is generated, $T_{iM}$, and the time said $SOF_{iS}$ is received, $(T_{iS})_M$, where the output of said M TDM means is an M time difference word (TDW) and where said M TDW is included in the digital data stream transmitted from M to S;
S TDM means, interconnected with said S clock and said S demultiplexer, where said S TDM includes an S TDM digital clock for measuring the time interval between the time said $SOF_{iS}$ is generated, $T_{iS}$, and the time said $SOF_{iM}$ is received, $(T_{iM})_S$, where the output of said S TDM means is an S time difference word (TDW) and where said S TDW is included in the digital data stream transmitted from S to M;

S calculating means, interconnected with said S clock and with inputs including said S TDW from said S TDW means and said M TDW transmitted to S from M, for calculating the asynchronism between said S clock and said M clock and for calculating the intersatellite range;

M calculating means, interconnected with said M clock and with inputs including said M TDW and said S TDW transmitted from S, for calculating the asynchronism and range, where said M and S calculating devices calculate the asynchronism according to the formula $$\Delta T_i = (T_{iS} - T_{iM}) = \frac{(\tau_{iM} - \tau_{iS}) + (d_f - d_r)}{2}$$

and the time delay in the free space channel between M and S according to the formula, $$R = \frac{(\tau_{iM} + \tau_{iS}) - (d_f + d_r)}{2}$$

where $T_{iS}$ is the true time when the predetermined S clock output signal is generated, $T_{iM}$ is the true time when the M predetermined M clock output signal is generated, $\tau_{iS}$ is the time delay encoded in the S TDW, $\tau_{iM}$ is the time delay encoded in the M TDW, $d_r$ is the equipment delay in the channel between S and M, $d_f$ is the equipment delay in the channel between M and S, said S calculating means also for generating a clock adjusting output signal for advancing or retarding said S clock so that said S clock is synchronized with said M clock.

16. The R & S system recited in claim 15 wherein:
said S calculating means is a microprocessor for calculating $\Delta T_i$ and R, and for generating said clock adjusting signal.

17. The R & S system recited in claim 15 wherein:
said high-rate digital data transferred to S from M is carried by an M laser beam generated by an M laser; and wherein:
said high-rate digital data transferred to M from S is carried by an S laser beam generated by an S laser.

* * * * *